United States Patent
Hötger et al.

(10) Patent No.: US 12,065,374 B2
(45) Date of Patent: Aug. 20, 2024

(54) METHOD FOR PRODUCING AN ELECTRONIC STRUCTURE ON A GLASS PANE AND GLASS SHEET HAVING AT LEAST ONE GLASS PANE OF THIS TYPE

(71) Applicant: HEGLA boraident GmbH & Co. KG, Beverungen (DE)

(72) Inventors: Bernhard Hötger, Lauenfoerde (DE); Heinrich Ostendarp, Haan (DE); Thomas Rainer, Wernigerode (DE)

(73) Assignee: HEGLA boraident GmbH & Co. KG, Beverungen (DE)

( * ) Notice: Subject to any disclaimer, the term of this patent is extended or adjusted under 35 U.S.C. 154(b) by 496 days.

(21) Appl. No.: 17/286,616

(22) PCT Filed: Oct. 18, 2019

(86) PCT No.: PCT/EP2019/078430
§ 371 (c)(1),
(2) Date: Apr. 19, 2021

(87) PCT Pub. No.: WO2020/079252
PCT Pub. Date: Apr. 23, 2020

(65) Prior Publication Data
US 2021/0363053 A1   Nov. 25, 2021

(30) Foreign Application Priority Data
Oct. 19, 2018 (DE) .................. 102018217970.0

(51) Int. Cl.
*C03C 17/00* (2006.01)
*C03C 17/36* (2006.01)
(Continued)

(52) U.S. Cl.
CPC ........ *C03C 17/002* (2013.01); *C03C 17/3644* (2013.01); *C03C 17/366* (2013.01);
(Continued)

(58) Field of Classification Search
CPC .............................. G01R 27/26; C03C 17/002
(Continued)

(56) References Cited

U.S. PATENT DOCUMENTS

| 9,240,563 B2 | 1/2016 | Schwab et al. |
| 2006/0272532 A1* | 12/2006 | Rainer ............... C03C 23/0025 101/483 |

(Continued)

FOREIGN PATENT DOCUMENTS

| DE | 9004145 | 7/1990 |
| DE | 102005025982 A1 | 12/2006 |

(Continued)

OTHER PUBLICATIONS

DE 10 2018 217 970.0: Preliminary Opinion attached to the Summons dated Jun. 2, 2021 and Statement of Relevance.
(Continued)

*Primary Examiner* — Vincent Q Nguyen
(74) *Attorney, Agent, or Firm* — Greer, Burns & Crain, Ltd.

(57) ABSTRACT

A method for producing an electronic structure on a glass pane which has, at least on one of its two glass pane surfaces, a functional coating having at least one electrically conductive functional layer, preferably having multiple electrically conductive functional layers, the functional coating being structured by applying laser radiation in such a way that the electronic structure, preferably a capacitive sensor system or a conductor loop, is created. A glass sheet having at least one glass pane of this type.

31 Claims, 1 Drawing Sheet

(51) Int. Cl.
*G06F 3/044* (2006.01)
*G08B 13/22* (2006.01)

(52) U.S. Cl.
CPC .......... *G06F 3/044* (2013.01); *C03C 2217/70* (2013.01); *C03C 2218/328* (2013.01); *G06F 2203/04103* (2013.01); *G08B 13/22* (2013.01)

(58) Field of Classification Search
USPC .................. 324/658, 660, 663; 359/27, 719
See application file for complete search history.

(56) References Cited

U.S. PATENT DOCUMENTS

| | | |
|---|---|---|
| 2009/0104436 A1 | 4/2009 | Berg et al. |
| 2015/0013884 A1* | 1/2015 | Yeh ...................... B23K 26/082 |
| | | 156/163 |
| 2015/0346868 A1 | 12/2015 | Kwon |
| 2016/0031737 A1* | 2/2016 | Hoppe ................ C03B 23/0235 |
| | | 65/102 |
| 2016/0201189 A1 | 7/2016 | Palacios-Laloy |
| 2017/0034875 A1 | 2/2017 | Weber et al. |
| 2018/0362400 A1* | 12/2018 | Streitsov ............... C03C 23/002 |
| 2019/0152194 A1* | 5/2019 | Schmalbuch ..... B32B 17/10036 |

FOREIGN PATENT DOCUMENTS

| | | |
|---|---|---|
| DE | 102005026038 A1 | 12/2006 |
| DE | 102006040352 B3 | 10/2007 |
| DE | 102014002644 A1 | 8/2015 |
| DE | 102018207181 A1 | 11/2019 |
| WO | 2011007297 A2 | 1/2011 |
| WO | 2011020721 A1 | 2/2011 |
| WO | 2013053611 A1 | 4/2013 |
| WO | 2015050762 A1 | 4/2015 |
| WO | 2020079252 A3 | 4/2020 |

OTHER PUBLICATIONS

PCT Application No. PCT/EP2019/078430: International Preliminary Report on Patentability (Apr. 14, 2021) and translation of Written Opinion (Mar. 2, 2021) (9 pages).

ETH Super Glass Improves Mobile Phone Reception, https://www.20min.ch/story/eth-superglas-macht-handy-empfang-besser-751368496402, Electromagnetic Waves, 4 pages, (Aug. 29, 2016).

BANOVEC "Comparison between chemical and pulsed laser etching of indium tin oxide thin films," Vacuum, vol. 43, Nos. 5-7, pp. 737 to 739 (1992).

\* cited by examiner

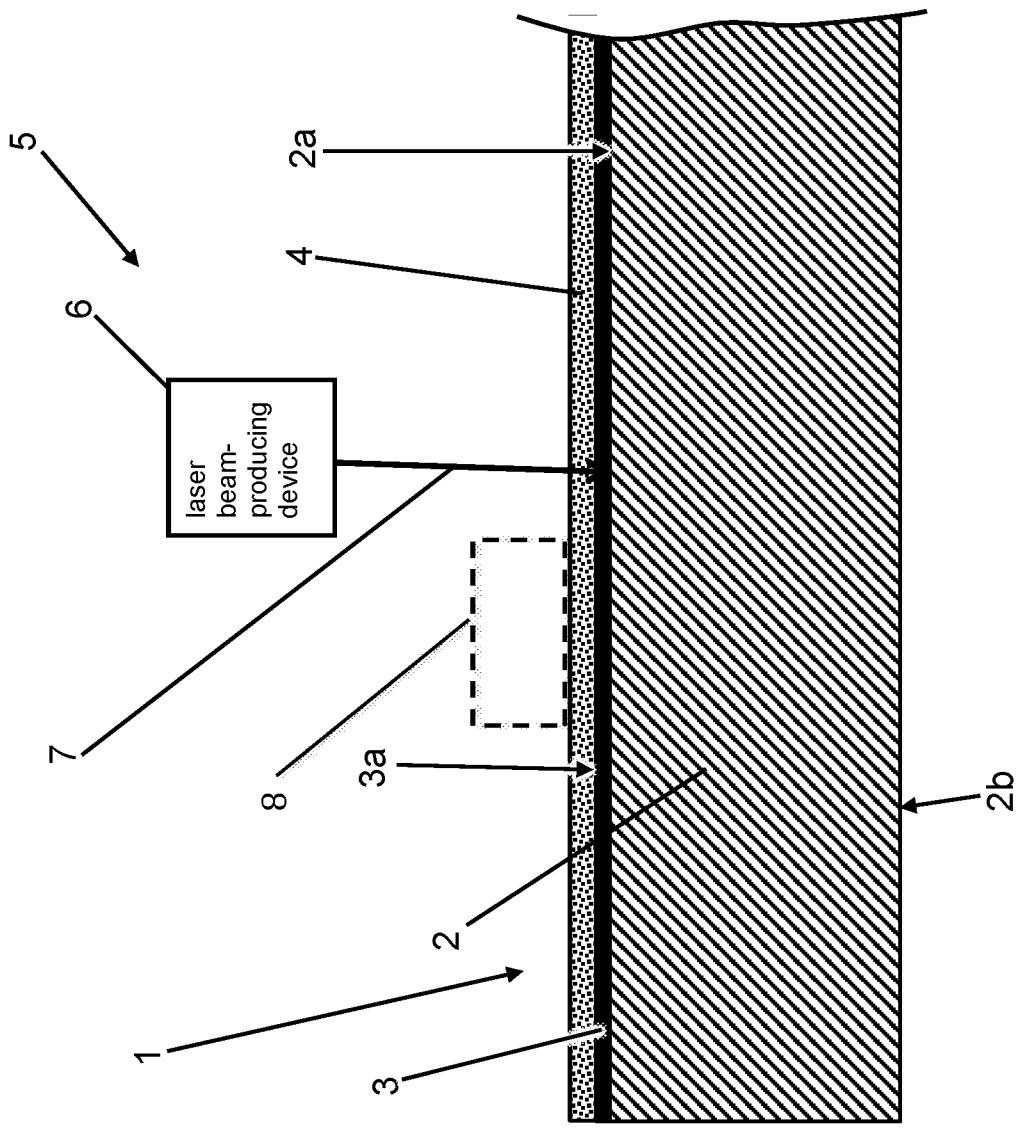

METHOD FOR PRODUCING AN ELECTRONIC STRUCTURE ON A GLASS PANE AND GLASS SHEET HAVING AT LEAST ONE GLASS PANE OF THIS TYPE

BACKGROUND

Field of Invention

The present invention relates to a method for producing an electronic structure on a glass pane, and to a glass sheet having at least one of such a glass pane.

Technical Background

All glass in the form of glass panes or sheets is referred to as flat glass, regardless of the production method used.

The glass sheets can be made up of a single glass pane or glass plate (single-pane glass), or can be laminated glass. A laminated glass sheet is generally understood as a glass sheet formed from two or more glass panes or glass plates having the same or different thickness, the glass panes being bonded to one another by an intermediate layer of plastic.

In order to provide flat glass sheets with filtering, mirroring, heating functions, or other functions, a wide variety of one-layer or multilayer functional coatings are applied onto the glass panes. The functions can be e.g. heat protection, sun protection, or heating. In the case of low-e glass (low-e=low-emissivity=low heat radiation), one or more metallic layers reduce the degree of emission of the glass panes, and act as a heat protective layer and/or sun protective layer.

The functional coating is usually an individual functional layer or a layer structure having a plurality of functional layers having an overall thickness <2 µm. The layer structure is usually obtained by deposition processes, preferably sputtering.

Thus, the individual functional layers are usually metallic and/or ceramic layers. For example, they are metallic low-emission layers or electrical heating layers. Between the individual metallic functional layers of a functional coating there may be arranged one or more dielectric (functional) layers, e.g. made of an oxide, such as aluminum oxide. In addition, an adhesive layer made of tin oxide is usually present between the functional coating and the glass surface.

Specific laminate glass sheets have e.g. a first, in particular inner, glass pane made of a usually uncoated glass pane, and a second, in particular outer, coated glass pane in particular which is provided with a heat protective layer.

Window glass of trains also usually has such a heat-insulating functional coating. Here, it is problematic that while the functional coating does result in a savings of energy, cell phone connection is impaired by it. This is because the metallic functional coating forms a Faraday cage that shields the interior of the train from electromagnetic waves. Based on this, the ETH Zurich developed a new window glass in which the functional coating is modified so that it is more transparent for electromagnetic cell phone waves and light (www.20 min.ch_wissen_news_story_ETH-Superglas-macht-Handy.pdf). The Faraday cage is interrupted by processing the metallic functional layer using a laser. Using the laser, a structure is engraved into the metallic functional layer, wherein approximately 2.5% of the surface is removed.

In addition, from DE 20 2014 002 644 A1 a method is known for producing a device for protecting birds. In this method, laser radiation is used to introduce an optical structure into a transparent material, in particular glass. This can be done for example by providing the transparent material with metallic layers and/or layers containing colored pigments, and partially removing and/or transforming these layers using laser radiation, so that a structuring takes place.

In addition, laser marking methods for marking glass sheets are known from DE 10 2005 026 038 A1 and DE 10 2005 025 982 A1.

According to DE 10 2005 026 038 A1, laser radiation is used to apply a glass-type layer having metallic nanoparticles onto the surface of the glass pane. For this purpose, a donor or carrier medium is brought into contact with the glass pane surface that is to be marked, and a marking is produced on the glass pane surface by laser beam-induced processes. The carrier medium has e.g. a PET foil that has e.g. a low-e functional coating, this coating having at least one metallic functional layer. For the marking, a laser beam is directed onto the functional coating, and, due to the laser beam radiation, material is transferred from the functional coating of the PET carrier foil onto the glass pane surface that is to be marked. The material adheres to the glass pane surface as a glass-type matrix having metallic nanoparticles, the matrix being formed from the substances originally present in the functional layers of the functional coating. The PET carrier foil remains intact.

According to DE 10 2005 025 982 A1, in a similar manner laser radiation is used to modify the color of the low-e functional coating of a glass pane, through laser radiation, in such a way that a marking is produced.

Moreover, in the field of organic electronics it is known to structure thin functional layers, inter alia on glass, using lasers.

In addition, alarm glasses are known in this technical area. These are glasses that trigger an intrusion alarm system when they are damaged or destroyed. For this purpose, a conductor loop, the so-called alarm loop or alarm spider, i.e. a network of electrical conductors, is applied onto the alarm glass or is embedded in a laminated safety glass. When the alarm glass is broken, the alarm loop is severed, the current is interrupted, and an alarm is activated. The alarm loop is usually provided by screen printing and burned in.

In addition, gesture recognition, or gesture controlling, is known in particular also in the automotive sector, or for controlling household or kitchen appliances, or as light switches. Gesture recognition refers to the automatic recognition by a computer of gestures made by human beings. This can take place in contactless fashion. In this context, systems are controlled by spatial hand, finger, or whole-body movements and gestures, without contact. For this purpose, sensor systems are used that have electrical fields for detecting or tracking the hand position. Conductive objects such as the human body cause a change in the electrical fields, which is then correspondingly further processed by a signal processor control unit and a computer program.

As already explained, it is known for example to control the light in living rooms in contactless fashion using gesture control. In kitchens, e.g. kitchen rear panels made of glass are increasingly used as splash protection. In this case, the corresponding sensors for the contactless gesture controlling are applied to the rear side of the kitchen rear panel. Usually, these are foils or thin circuit boards glued onto the glass surface, which contain the required strip conductors.

BRIEF SUMMARY

The object of the present invention is to provide a simple and low-cost method for producing an electronic structure, preferably a capacitive sensor system or an alarm loop, on a glass pane.

A further object of the present invention is to provide a glass sheet having an electronic structure, produced at low cost.

These objects are achieved by a method according to claim 1, as well as a glass sheet according to claim 21. Advantageous developments of the invention are characterized in the subsequent subclaims.

In the context of the present invention, it has been discovered that it is possible, using laser radiation, to structure the already-present functional coating of a glass pane in regions, or in a particular segment or region, in such a way that an electronic structure, preferably a capacitive sensor system or a conductor loop, is produced.

An electronic structure has at least one electronic component. In addition, it can have conductor tracks, in a known manner. An electronic structure is therefore an electronic module, or an electronic functional unit, or an electronic circuit, or an electronic component.

BRIEF DESCRIPTION OF THE DRAWINGS

In the following, the present invention is exemplarily explained in more detail on the basis of a drawing.

FIG. 1 shows, in a highly simplified and schematic manner, a section through a glass pane (single-pane glass) having a functional coating and protective layer and having a structuring device for the one method according to the present invention.

DETAILED DESCRIPTION

The glass sheet 1 (FIG. 1) to be structured according to the present invention is for example a single-pane glass sheet that has only one individual, or a single, glass pane 2. Glass pane 2 has two glass pane surfaces 2a;b. In addition, glass pane 2 has a surface functional coating 3 over the complete surface of at least one of its two glass pane surfaces 2a;b. Functional coating 3 has an outer functional coating surface 3a facing away from glass panes 2.

Functional coating 3 can have one or more individual functional layers. If a plurality of functional layers are present, it is thus a functional layer laminate. The functional layers modify particular properties of glass pane 2, or impart particular functions to it.

The functions may be e.g. heat protection, sun protection, or heating. Preferably, functional coating 3 is a wavelength-selective or low-e coating.

Functional coating 3 of glass sheet 1 has at least one, preferably a plurality of, electrically conductive metal-containing functional layers. In addition, functional coating 3 can have at least one electrically semiconducting functional layer. Preferably, in each case this is a metallic layer or a, preferably ceramic, metal oxide layer. The metallic functional layers are preferably embedded in oxidic functional layers, e.g. made of a metal oxide, preferably tin oxide, which increases transmission and durability.

Moreover, functional coating 3 can have a functional layer made of, preferably ceramic, metal oxide, preferably tin oxide, that is directly bonded to glass pane surface 2a;b, and that bonds the remaining layers of functional coating 3 to glass pane surface 2a;b. The functional layer made of metal oxide, preferably tin oxide, thus acts at the same time as an adhesive layer.

Preferably, a metal-containing, preferably metallic, functional layer includes silver, copper, or gold. A functional layer of metal oxide is preferably made of tin oxide.

Of course, the ceramic functional layer need not be made of oxide ceramic. It can e.g. also be a non-oxidic ceramic functional layer.

Functional coating 3 can also have at least one electrically insulating functional layer.

Functional coating 3 of glass sheet 1 thus has at least one electrically conductive metallic functional layer and/or at least one, preferably metal-containing, ceramic functional layer.

The application of the functional layers onto glass pane 2 preferably takes place by sputtering or wet-chemically.

In addition, functional coating 3 preferably has a thickness of <2 µm, preferably <1 µm.

In addition, glass sheet 1 can have a known protective coating 4, in the form of a polymer protective layer or a peel-off protective film, on at least one of the two glass pane surfaces 2a;b. Protective coating 4 protects in particular functional coating 3 situated under protective coating 4 or, if no functional coating 3 is present, protects the bare glass pane surface 2a;b from mechanical damage. In contrast to functional coating 3, protective coating 4 is completely removed before the final use of glass sheet 1.

As already explained, in the method according to the present invention the introduction of the electronic structures takes place by means of laser structuring of the functional coating 3.

A structuring device 5 (FIG. 1) preferably used for this purpose has for this purpose a laser beam-producing device 6 for producing a laser beam 7. For this purpose, laser beam-producing device 6 has a laser radiation source and an associated optics. Laser beam 7 is focused by the optics. Here, laser beam 7 can be pivoted or deflected from an initial position in which it is oriented vertically or perpendicular to glass pane surface 2a;b.

The laser radiation source preferably produces a laser beam 7 whose wavelength is from 170 nm to 2 µm, preferably 300 nm to 1200 nm, particularly preferably 1000 nm to 1100 nm.

In addition, the laser radiation source preferably produces a laser beam 7 whose laser power is <500 W, preferably <200 W, particularly preferably <100 W, and/or ≥0.5 W, preferably ≥1 W, particularly preferably ≥2 W.

Moreover, the laser radiation source preferably produces a pulsed laser beam 7. However, it can also produce a continuous laser beam 7.

In order to introduce the structures, glass pane 1 and laser beam 7 must be moved relative to one another, parallel to glass pane surfaces 2a;b. Preferably, only laser beam 7 is moved. The movement of laser beam 7 is preferably accomplished using the optics of laser beam-producing device 6. This is because the optics of laser beam-producing device 6 is preferably capable of moving laser beam 7 in a region of e.g. 100 mm×100 mm (scanning field) with the aid of two adjustable mirrors (scanning optics).

In laser structuring, individual, or all, functional layers of functional coating 3 are completely removed in some regions by laser beam 7, in particular they are vaporized or burned off or modified in such a way that they are no longer electrically conductive, i.e. are electrically insulating. If the respective functional layer is only to be modified, the radiation then takes place below the threshold of removal. Thus, no material is removed during the modification. In particular, during the modification the composition of the functional layer is chemically and/or physically modified. For example, functional coating 3 can have functional layers made of atomic silver, which are modified through the action of laser beam 7 in such a way that the silver atoms agglomerate and form nanoparticles. As result, the functional layer made of atomic silver loses its electrical conductivity and becomes insulating. Preferably, the functional layers of atomic silver are embedded in functional layers that are realized as protective layers and are preferably electrically insulating, e.g. made of metal oxide, in particular tin oxide.

The laser power and/or the wavelength of laser beam 7 is thus adjusted in each case depending on the desired result and depending on the functional layer to be processed.

In this context, before the laser structuring protective coating 4 can be removed, e.g. also by laser radiation and/or mechanically. Or laser coating 4 is removed during the laser structuring by the laser radiation in the region of the electronic structure, in that it is removed, preferably burned off, by the laser radiation.

In this context, the laser radiation can be radiated through glass pane 2, or can not be radiated through glass pane 2.

It is within the scope of the present invention that layers and structures structured by laser radiation are combined with further, subsequently applied layers and structures. In this case, functional coating 3 is structured using laser radiation, as described above, so that an electronic structure, e.g. a conductor loop, is produced. Subsequently at least one further electronic structure, e.g. one or more conductor loops, is applied onto the structured region or onto the produced structure, preferably by printing or by laser sintering, e.g. using the method according to DE 10 2006 040 352 B3.

For the case in which no protective coating is present on the glass pane, or on the electronic structure produced by laser radiation, the additional layers and/or structures are preferably applied using the method according to DE 10 2005 026 038 A1. That is, functional layer material from a donor or carrier medium is printed by laser radiation onto the surface of the glass pane having the already-produced structure. For this purpose, the carrier medium having a surface functional coating made of the functional layer material is brought into contact, with its coated side, with the region on the glass pane that is to be printed. Then, using the laser radiation focused onto the functional coating, the functional layer material is transferred from the functional coating onto the glass pane, in particular onto the outward-oriented, already-produced electronic structure, or onto the structure and at least partly onto the functional coating (3) and/or glass surface, and is fixed thereon. Because the laser radiation is absorbed by the functional layer material, this material is detached from the carrier medium and transferred onto the glass pane.

For the case in which a protective coating 4 is provided on the glass pane, or on the electronic structure produced by laser radiation, the additional layers and/or structures are preferably applied using the method according to DE 10 2018 207 181 A1. That is, the protective coating is removed, preferably burned off or burned away, using laser radiation, and in the same working step functional layer material from a donor or carrier medium is printed by the laser radiation onto an exposed surface of the glass pane that was previously situated under the protective coating of the glass pane. Here, the carrier medium having a surface functional coating made of the functional layer material is brought into contact, with its coated side, with the protective coating of the glass pane in the region to be printed. The protective coating is then removed by the laser radiation, and, as described, the functional layer material is transferred from the functional coating onto the glass pane, in particular onto the outward-oriented, already-produced electronic structure, or onto the structure and at least partly onto the functional coating (3) and/or glass surface, and is fixed thereon.

Preferably, in both described methods for producing additional layers and/or structures a laser beam is produced whose wavelength is from 190 nm to 12 μm, preferably 500 nm to 2 μm, and/or whose laser power is <20 W, preferably <10 W, and/or ≥0.5 W, preferably ≥5 W. The donor or carrier medium is preferably a coated plastic foil, preferably made of PET.

The carrier medium is preferably strip-shaped. The carrier medium has the functional coating made of functional layer material that has at least one metal-containing, preferably metallic, functional layer and/or at least one ceramic functional layer.

By the combination with subsequently provided layers and structures 8, the functional coating on the glass pane, or the structure produced by laser structuring, is supplemented, so that a combined electronic structure is produced that, overall, has more functional layers than were originally contained in the functional coating. In this way, the regions or structures structured according to the present invention can be supplemented or expanded, e.g. in the form of a subsequently applied contact pad, in such a way that a multilayer overall structure is formed having a plurality of layers arranged one over the other, including insulating layers.

An advantage of the method according to the present invention is that an electronic structure, or a sensor field, can be produced on glass pane 2 in a simple and low-cost manner. This is because it is necessary only to structure, by laser radiation, the full-surface functional coating 3 that is already present on glass pane 2. There is no additional application, in particular printing, of the electronic structure.

In this way, for example alarm glass sheets can be produced in a very simple manner, in that the alarm loop, or alarm spider, is produced by laser structuring of functional coating 3. The glass pane can also be provided with a large-surface proximity sensor which, when approached, causes a light to turn on or an alarm to be activated.

Capacitive sensor systems can also be produced for operating household or medical devices, e.g. on kitchen rear panel glass sheets for producing a kitchen backsplash.

In addition, the removal of the functional layers results in openings in functional coating 3 that can also be used for shaping, e.g. if there are interior elements. Thus, it is e.g. also possible to form these openings as symbols, to illuminate them from behind, and in this way to indicate to the user the region of a gesture sensor system as a "switching space".

The functional layers are produced by glass manufacturers for the purpose of a particular function, e.g. heat insulation. The possibility of using a laser as a tool to locally modify individual properties of the layers that are not actually used for the primary application (e.g. heat insulation), in order to achieve additional properties in the overall product, is not obvious. Rather, it is only through the provision of suitable laser tools (in recent years), and the trend towards increasing the ease of use of building products (keyword: smart home), that, on the one hand, the required tool basis and, on the other hand, the demand for "more" functions in e.g. windowpanes has come about. This has led to the question: how can more functions be integrated into windows at low cost? One solution to this is the laser structuring with the aim of realizing new functions by local modification of properties—without significantly impairing the original primary function of the layers (e.g. heat insulation)!

In this context, it also lies within the scope of the present invention to incorporate the structures into a glass pane 2 of a laminated glass sheet made up of a plurality of glass panes 2 bonded to one another (not shown). In this case, the structuring can be produced both on an external glass pane surface 2*a;b* and on an internal glass pane surface 2*a;b*, if this surface has a functional coating 3.

EXEMPLARY EMBODIMENT

According to the present invention, an alarm loop is produced on single-pane glass having a low-e coating, through inverse decoating of the low-e layer using the laser beam, a conductor loop being produced between two insulation lines, with the following parameters:
- wavelength of the laser beam 1064 nm,
- track width 100 μm,
- length of the track approximately 50 mm, and
- electrical resistance of the track approximately 12 ohms.

In the building, the conductor loop is loaded with voltages ≥24 V. If the glass is broken, e.g. in the case of a break-in, the flow of current through the conductor loop is interrupted and an alarm is triggered.

The invention claimed is:

1. A method for producing an electronic structure on a glass pane comprising two glass pane surfaces, at least on one of the two glass pane surfaces having a functional coating thereon, the functional coating having at least one electrically conductive functional layer, the method comprising:
    applying laser radiation to the functional coating in such a way that the electronic structure is produced,
    applying at least one further electronic structure onto the electronic structure produced from the functional coating by laser radiation, so that a joint electronic structure is produced, wherein the joint electronic structure has more electrically conductive functional layers than were originally contained in the functional coating,
    providing a carrier medium for applying the at least one further electronic structure onto the electronic structure produced from the functional coating by laser radiation, wherein the carrier medium has a surface functional coating made of functional material having at least one metal-containing and/or at least one ceramic functional layer, and, using the laser radiation, transferring the functional layer material of the functional coating of the carrier medium, in the form of the further structure to be applied, onto the previously produced electronic structure and, if appropriate, onto the glass surface and/or onto the functional coating.

2. The method according to claim 1, wherein applying laser radiation to the functional coating comprises completely removing individual, or all, electrically conductive functional layers of the functional coating in some regions of the functional coating by a laser beam.

3. The method according to claim 1, wherein applying laser radiation to the functional coating comprises modifying individual, or all, electrically conductive functional layers of the functional coating in some regions of the functional coating by a laser beam in such a way that they become electrically insulating.

4. The method according to claim 3, wherein the modifying comprises modifying at least one electrically conductive functional layer comprising atomic silver in such a way that the silver atoms agglomerate and form nanoparticles, so that the functional layer comprising atomic silver loses its electrical conductivity.

5. The method according to claim 1, wherein during applying laser radiation to the functional coating, using a laser beam having a wavelength of 170 nm to 2 μm, and/or having a laser power <500 W and/or having a laser power of ≥0.5 W.

6. The method according to claim 1, further comprising removing a protective coating covering the functional coating on the glass pane by laser radiation in the region of the electronic structure that is to be produced, and in the same working step producing the electronic structure by applying the laser radiation to the functional coating.

7. The method according to claim 1, wherein a pulsed laser beam or a continuous laser beam is used.

8. The method according to claim 1, wherein the electronic structure is produced on a single-pane glass sheet or on a glass pane-of a laminated glass sheet.

9. The method according to claim 1, wherein the functional layer is a metallic layer or a metal oxide layer.

10. The method according to claim 1, wherein the functional coating is a low-e coating.

11. The method according to claim 1, wherein the laser radiation is radiated through the glass pane, or is not radiated through the glass pane.

12. The method according to claim 1, wherein a focused laser beam is used.

13. The method according to claim 12, wherein the laser beam is focused onto the coated glass pane surface.

14. The method according to claim 1, wherein the functional coating has an electrically semiconducting functional layer and/or an electrically insulating functional layer.

15. The method according to claim 1, wherein the at least one further electronic structure is applied in such a way that a multilayer overall structure having a plurality of electrically conductive functional layers arranged one over the other is formed.

16. The method according to Claim 1, wherein the laser radiation is absorbed by the functional coating of the carrier medium in such a way that the functional layer material is blasted from the carrier medium and is transferred onto the surface that is to be coated of the glass pane.

17. A glass sheet having at least one glass pane comprising two glass pane surfaces, at least on one of the two glass pane surfaces having a functional coating thereon, the functional coating having at least one electrically conductive functional layer, wherein the glass pane has an electronic structure that has been produced by laser structuring of the functional coating by application of laser radiation thereto, wherein the electronic structure produced from the functional coating by laser radiation comprises at least one further electronic structure applied thereto, so that a joint electronic structure is formed, wherein the joint electronic structure has more functional layers than were originally contained in the functional coating, and wherein the further electronic structure is applied according to the method according to claim 1.

18. The glass sheet according to claim 17, wherein the glass sheet is an alarm glass sheet, comprising the joint electronic structure in the form of an alarm loop or in the form of a proximity sensor.

19. The glass sheet according to claim 17, wherein the glass sheet is a kitchen rear panel glass sheet for producing a kitchen rear panel, comprising the joint electronic structure in the form of a capacitive sensor system.

20. The glass sheet according to claim 17, wherein the glass sheet is provided on a household or medical device, comprising the joint electronic structure in the form of a capacitive sensor system for operating the kitchen or medical device.

21. The method according to Claim 1, further comprising providing the carrier medium in the form of a strip-shaped carrier film.

22. A method for producing an electronic structure on a glass pane comprising two glass pane surfaces, at least on one of the two glass pane surfaces having a functional coating thereon, the functional coating having at least one electrically conductive functional layer, the method comprising:
  applying laser radiation to the functional coating in such a way that the electronic structure is produced,
  applying at least one further electronic structure onto the electronic structure produced from the functional coating by laser radiation, so that a joint electronic structure is produced, wherein the joint electronic structure has more electrically conductive functional layers than were originally contained in the functional coating,
  removing a protective coating covering the functional coating on the glass pane by laser radiation in the region of the electronic structure that is to be produced, and in the same working step producing the electronic structure by applying the laser radiation to the functional coating.

23. The method according to claim 22, wherein applying laser radiation to the functional coating comprises completely removing individual, or all, electrically conductive functional layers of the functional coating in some regions of the functional coating by a laser beam.

24. The method according to claim 22, wherein applying laser radiation to the functional coating comprises modifying individual, or all, electrically conductive functional layers of the functional coating in some regions of the functional coating by a laser beam in such a way that they become electrically insulating.

25. The method according to claim 24, wherein the modifying of the electrically conductive functional layers comprises modifying at least one electrically conductive functional layer comprising atomic silver in such a way that the silver atoms agglomerate and form nanoparticles, so that the functional layer comprising atomic silver loses its electrical conductivity.

26. The method according to claim 22, wherein the electronic structure is produced on a single-pane glass sheet or on a glass pane-of a laminated glass sheet.

27. The method according to claim 22, wherein the functional coating is a low-e coating.

28. The method according to claim 22, wherein a focused laser beam is used.

29. The method according to claim 28, wherein the laser beam is focused onto the coated glass pane surface.

30. The method according to claim 22, wherein the functional coating has an electrically semiconducting functional layer and/or an electrically insulating functional layer.

31. The method according to claim 22, wherein the at least one further electronic structure is applied in such a way that a multilayer overall structure having a plurality of electrically conductive functional layers arranged one over the other is formed.

* * * * *